Figure 4:
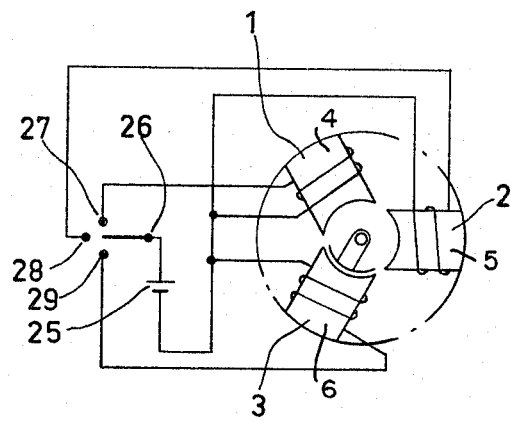

April 30, 1968  G. STENUDD  3,381,151
ELECTRIC STEP-BY-STEP MOTOR
Filed Nov. 8, 1965  2 Sheets-Sheet 1
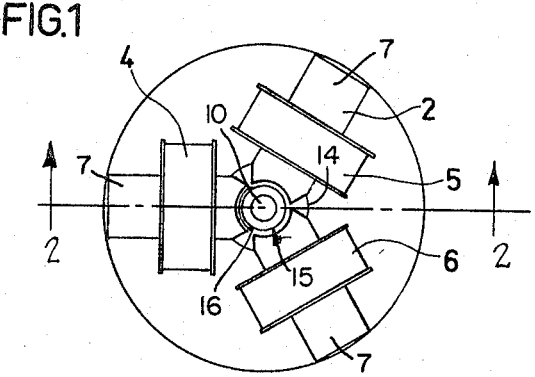
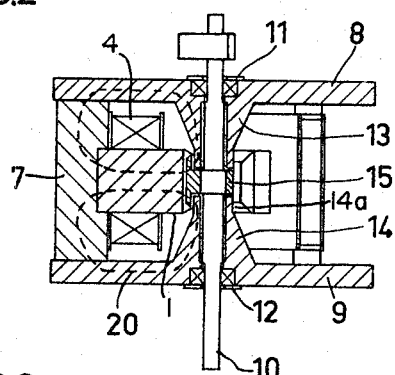
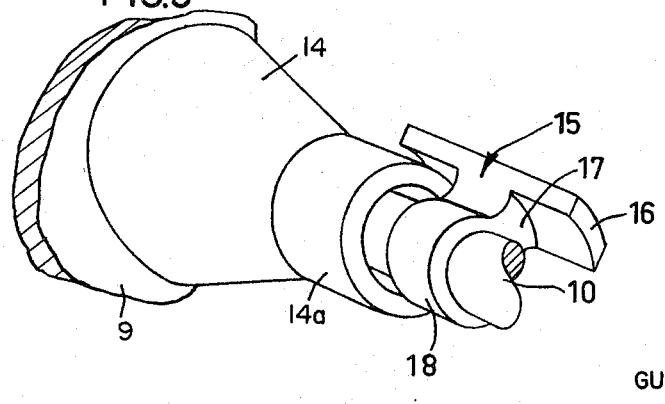
INVENTOR.
GUNNAR STENUDD
BY Darby+Darby
ATTORNEYS

INVENTOR.
GUNNAR STENUDD

United States Patent Office 3,381,151
Patented Apr. 30, 1968

3,381,151
ELECTRIC STEP-BY-STEP MOTOR
Gunnar Stenudd, Lidingo, Sweden, assignor to Aktiebolaget Atvidabergs Industrier, Atvidaberg, Sweden, a joint-stock company of Sweden
Filed Nov. 8, 1965, Ser. No. 506,678
Claims priority, application Sweden, Nov. 9, 1964, 13,492/64
5 Claims. (Cl. 310—49)

The present invention relates to an electric step-by-step motor of the reluctance type, specially intended for stepping at high speed and large torque. Electric step-by-step motors have a wide application in effecting rapid stepping by accurately defined steps, e.g., in totalizers and selectors, also for step-by-step feeding of magnetic tape and punch tapes in data recording equipments.

In one embodiment of a step-by-step motor that is often used in totalizers and telephone selectors, a toothed wheel is turned step-by-step by an electromagnet furnished with a pawl. This type of step-by-step motor has a large number of disadvantages, such as a limited stepping speed, a high noise level and much wear and tear on moving parts.

Another type of step-by-step motor has a multi-polar, permanently magnetized rotor (armature) and a stator with two windings, of the same type as used in two-phase servo-motors. When the field windings are *energized*, the rotor adjusts itself according to the resulting magnetic flux, and by reversing the direction of current in the windings, it is possible to move the rotor in the desired direction, through an angle-step, which is decided by the number of poles. This type of motor has, due to different reasons, a large number of poles on the rotor, and this renders the magnetic energy, which is available for the turning of the rotor, relatively low.

Because the rotor also has a relatively large mass, the torque and the stepping speed become limited. In addition, it is impossible, without external contacts and the like, to ascertain the present position of the rotor because the rotor has no definite reference position, i.e., position of rest. Should the motor, for some reason, miss one or more steps, this can neither be indicated nor corrected. A third type of step-by-step motor has a rotor, of soft magnetic material which has the shape of a toothed wheel and is mounted in a stator that is provided with salient—clearly defined—poles. The stator poles form two magnetic circuits with permanent magnets for positioning, and they are so displaced, in relation to the pitch of the toothed wheel, that the latter is held attracted by either one or the other of the circuits. By feeding the current through a driving coil, the flux in the magnetic positioning circuit can be decreased, while simultaneously the flux in the other circuit can be increased and advances the rotor one step. When the driving current ceases, the rotor stops in the new position due to the permanent flux. Also in this case this motor has a very limited torque because the magnetic energy in the air-gap is insignificant due to the small extent of the salient poles and the rotor ends. The positioning is relatively bad due to the balanced fluxes, and already at moderate load, the rotor is apt to jump from one position to an adjacent position. This motor also lacks a rest position.

This invention refers to a step-by-step motor in which all these disadvantages are eliminated. The motor can be constructed with a very high torque even with small rotor dimensions and the position of the rotor is always definite. An electric step-by-step motor of the reluctance type, according to the invention, comprises a stator with at least three poles, provided with separate windings and arranged to be magnetized successively. The invention is characterized in that the rotor is made of a soft magnetic material and has one single pole, whose peripheral extension, principally corresponds to the pitch of the stator poles, a magnetic-return circuit being arranged from the rotor to all stator poles.

Figure 5:
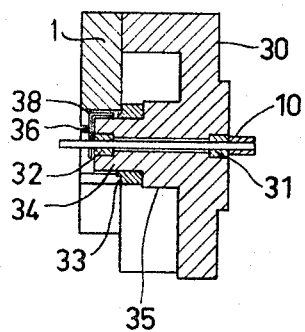
Figure 6:
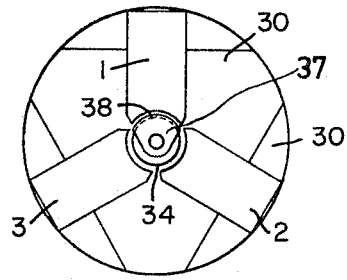

The invention will be described more in detail with reference to the appended drawings, where FIG. 1 is a top plan view of the motor of this invention with the upper cover plate removed, FIG. 2 is an axial section through the step-by-step motor taken on the plane of line 2—2 of FIGURE 1, FIG. 3 is an isometric view of the rotor and part of the magnetic circuit, FIG. 4 is a schematic diagram of the circuits that are required for effecting the stepping, and FIGS. 5 and 6 are an axial and a radial section respectively of another embodiment.

In FIGS. 1 and 2, three magnetic poles 1, 2 and 3 form the stator, and are made of solid or laminated soft, magne ic material. They are provided with separate windings 4, 5 and 6 and are fixed to yokes 7 of soft, magnetic material. All the yokes are mounted between two end plates 8 and 9, likewise of soft, magnetic material. The end plates are furnished with bearings 11 and 12 for the motor-shaft 10. Circuit completing members 13 and 14 extend from the end-plates concentrically with the shaft, towards the rotor 15 made of soft, magnetic material. The rotor 15 is shown in detail in the perspective view in FIG. 3, and has the shape of a segment of a cylinder 16, which is united by a rib 17 to a hub 18 that is secured on the shaft 10. The cylindrically shaped end parts 13a and 14a of the return columns 13 and 14 extend inwards under the rotor's shanks 16 with the least possible air gap, to provide a closed path with low reluctance for the rotor flux, as is indicated by the flux lines 20 in FIG. 2.

The function of the motor will now be more closely described with reference to FIG. 4. This figure shows in principle the circuits that are required to step the motor. If the winding 4 receives current from the battery 25, over the contact 27, on the switch 26, a field is generated in the air-gap, between the pole 1 and the return conductors 13 and 14 (FIG. 2). According to well-known principles, the air-gap seeks to decrease its energy as much as possible, which can be achieved by reducing the volume of the air-gap itself, i.e. moving the soft, magnetic rotor to partly fill the air-gap. The reduction of the field energy is converted into mechanical work, that turns the rotor in the field with a torque of $M_v$ $$M_v = KB^2$$

where K is the constant for a given motor and dependent on the motor's dimensions and B is the flux density in the air-gap. The rotor's torque is thus constant during the whole work-cycle.

The stepping of the motor one step, in a clockwise direction, is achieved by moving the switch to the contact 28, and counterclockwise stepping by moving it to the contact 29.

Due to the single-pole design of the rotor, in combination with the triple-pole stator, the rotor's position is always definite. If the rotor, for some reason, should jump to an incorrect position, it will in any case, position itself correctly at the next step. After a stepping operation the rotor can be kept in the desired position, either, by allowing the stator current to continue to flow, possibly with reduced strength, or by means of a mechanical or magnetic arresting mechanism.

The magnetic circuit of the motor is so constructed that the iron is near its saturation point immediately adjacent to the rotor air-gap, but works with a relatively low flux density in the other parts. This is, for instance, attained by the bevelling of the poles 1, 2 and 3, and the conical shape of the return conductors 13 and 14 outside the rotor air-gap.

FIGS. 5 and 6 show another embodiment of the step-by-step motor according to the invention in a simplified mechanical modification. The stator is manufactured with one single yoke 30, that replaces the yokes 7 and the end plates 8 and 9 in FIGS. 1 and 2. In the yoke 30 the shaft 10 is journalled in the bearings 31 and 32. This renders the manufacture simpler because no fitting of the two bearing halves is necessary. The poles 1, 2 and 3 are mounted directly onto the yoke 30. The position of the poles is fixed by a ring 33 of non-magnetic material, that is pushed over the narrower cylindrical part 34 of the magnetic-return conductor 35.

The rotor 36 comprises a sector-shaped hub 37 that is secured on the free end of the shaft 10 and has a segment of a cylinder 38 which is arranged perpendicularly thereto and extends into the air-gap, and has a peripheral extension corresponding to the pole face.

What I claim is:

1. An electric step-by-step motor of the reluctance type comprising, in combination, a shaft, a stator having at least three magnetic poles with the pole faces arranged radially about said shaft as a center, said pole faces being arranged on the circumference of a circle, a winding mounted on each said pole piece, a rotor mounted on said shaft, said rotor having a radial extension terminating in a peripherally extending portion of soft magnetic material concentric with said pole face circle, said portion corresponding to the peripheral extent of the pole face and a magnetic circuit completing means extending about said shaft adjacent said rotor and connected to the outer ends of all of said stator pole pieces.

2. An electric step-by-step motor as claimed in claim 1, wherein said magnetic circuit completing means comprises a generally conical member extending about said shaft and an end plate of soft magnetic material connecting said member to said pole pieces, said end plate also serving to house said motor.

3. An electric step-by-step motor as claimed in claim 1, wherein said magnetic circuit completing means comprises at least one generally conical member coaxial to the motor shaft, and wherein said faces of said pole pieces form a cylinder, said pole pieces and magnetic circuit completing member cooperating to form annular air gaps, and wherein said peripherally extending portion of said rotor forms a segment of a cylinder extending into and being substantially circumferentially coextensive with one of said air gaps.

4. An electric step-by-step motor as claimed in claim 1, wherein said magnetic circuit completing means comprises two generally conical members extending about said shaft, one at each end of said rotor, an end plate fixed to each said conical member, and a yoke interconnecting said end plates and forming a mounting for said pole pieces.

5. An electrical step-by-step motor as claimed in claim 3, wherein said generally conical member terminates in a cylindrical portion adjacent said rotor, said cylindrical portion having a reduced cross-sectional area in the region facing said pole pieces, whereby the flux density in said reduced area is substantially at the saturation point when one of said windings is energized.

References Cited

UNITED STATES PATENTS

| | | | |
|---|---|---|---|
| 1,638,614 | 8/1927 | Brewster | 310—49 |
| 2,446,290 | 8/1948 | Lovegrove | 310—49 |
| 2,964,662 | 12/1960 | King | 310—49 |
| 3,154,707 | 10/1964 | Bright | 310—266 |
| 3,174,064 | 3/1965 | Muller | 310—49 |

FOREIGN PATENTS

| | | |
|---|---|---|
| 757,904 | 3/1953 | Germany. |
| 1,102,263 | 3/1961 | Germany. |
| 1,134,150 | 8/1962 | Germany. |

MILTON O. HIRSHFIELD, *Primary Examiner.*

G. NUNEZ, *Assistant Examiner.*